Sept. 20, 1966 W. R. KOCH 3,274,499
VIDEO GATE WITH PEDESTAL CANCELLATION
Filed Aug. 13, 1963
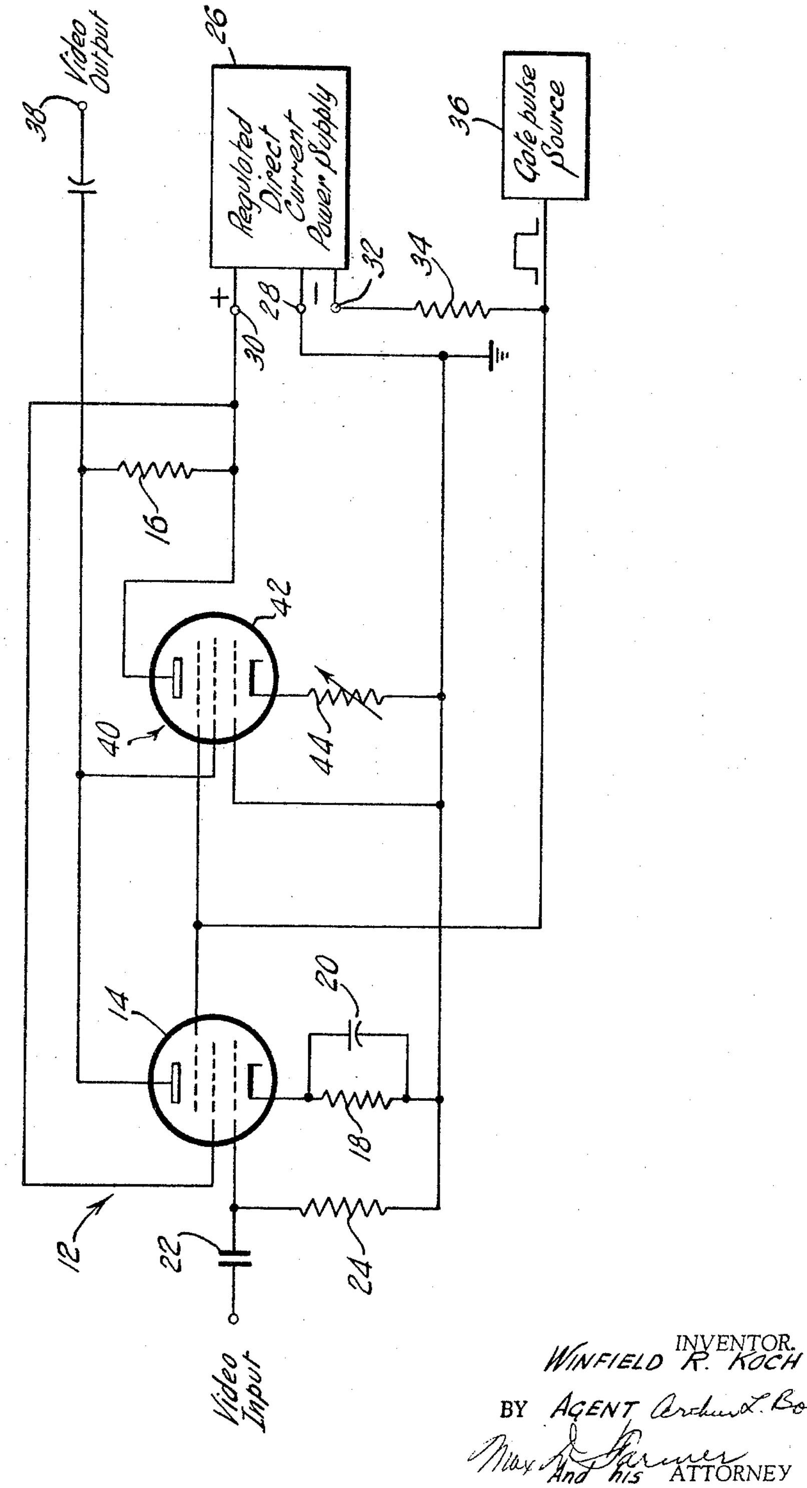
INVENTOR.
WINFIELD R. KOCH
BY AGENT
And his ATTORNEY United States Patent Office 3,274,499

Patented Sept. 20, 1966

3,274,499

VIDEO GATE WITH PEDESTAL CANCELLATION

Winfield R. Koch, Marlton, N.J., assignor, by mesne assignments, to the United States of America as represented by the Secretary of the Navy Filed Aug. 13, 1963, Ser. No. 301,927
1 Claim. (Cl. 328—99)

This invention relates to a switching circuit for use in radar equipment for switching broad band radio frequency signals including pulse signals without modifying the signals with switching transients.

It has been the practice heretofore in radar operation to switch video bandwidth signals off and on with diode gates, transistors, or by converting to push-pull, then switching, and then reconverting with a differential amplifier, to avoid the transients introduced by switching the direct current component in the circuit. Experience has shown that these prior art switching devices modify the video because they introduce, at the time of switching, a transient spike or a change in the level of the direct current component termed a pedestal.

An object of this invention is to provide a video switching circuit which does not modify the video.

A further object is to maintain substantially constant the direct current component through a load element of an electron discharge device while video bandwidth signals through the discharge device and the load element are switched on and off.

Other objects and advantages will appear from the following description of an example of the invention, and the novel features will be particularly pointed out in the appended claim.

The single figure is a schematic circuit diagram of an embodiment of the invention.

The illustrated embodiment includes a video amplifier 12 of a radar equipment, the amplifier having a pentode 14, a plate load resistor 16, a cathode bias resistor 18 shunted by a radio frequency bypass capacitor 20 and video signal coupling elements including capacitor 22 and resistor 24. A regulated direct current source 26 including a reference or ground terminal 28, a positive terminal 30 for supplying plate voltage and screen grid voltage and a negative terminal 32 for supplying suppressor grid bias voltage is connected to the video amplifier. A resistor 34 is connected between the screen grid and the negative terminal 32. A keyer or gate pulse source 36 for supplying steep-sided positive keying pulses is connected to the suppressor grid.

The negative voltage at terminal 32 is of sufficient amplitude to normally cut off the plate current of pentode 14. The amplitude of the pulses supplied by the gate pulse source is selected for a selected level of the direct current component of plate current when the amplifier is gated on. When the amplifier 14 is gated on, the input video signal is amplified and appears at output terminal 38. However, transient spikes are added to the video by the gating.

In accordance with this invention, the illustrated embodiment includes a compensator 40 replacing the direct current component through the plate load resistor 16 when the pentode 14 is switched off to maintain the direct current component through resistor 16 essential constant during switching.

The compensator includes a pentode 42 essentially identical to pentode 14. A variable bias resistor is connected between the cathode of pentode 42 and reference terminal 28. The plate of pentode 42 is connected directly to power supply terminal 30. The suppressor grid of pentode 42 is connected in common with the suppressor grid of pentode 14; the screen grid of pentode 42 is connected in common with the plate of pentode 14; the control grid of pentode 42 is connected directly to reference terminal 28. The bias resistor 44 is adjusted so that the screen grid current of pentode 42 is essentially equal to the direct current component of plate current of pentode 14 when the latter is gated on.

The compensator 40 operates to maintain essentially constant the direct current component in the plate load resistor 16. The screen current of pentode 40 and the plate current of pentode 14 is supplied through load resistor 16; the two currents change in inverse relationship during switching so that the direct current through load resistor 16 is unchanged.

The pentode 14 has its plate current cut off by the negative bias on the suppressor grid. However, the negative bias on the suppressor grid of the pentode 40 makes its screen current large. When the video amplifier is gated on by reducing the negative bias on the suppressor grid, the plate current of the video amplifier tends to increase the direct current through the load resistor 16. However, the simultaneous reduction of the negative bias on the suppressor grid of pentode 42 reduces the screen grid current through the load resistor thereby holding constant the direct current component through the load resistor. By using separate electrodes for the video and for the gate pulses, switching can be made rapid enough to avoid possible transient spikes.

The variable bias resistor 42 is adjustable to keep the pedestal small particularly when tubes are replaced. Number 5636 tubes have been used in one circuit in accordance with the invention. However, the tubes can be any wherein the suppressor grid can control the plate current as described.

It will be understood that various changes in the details, materials and arrangements of parts (and steps), which have been herein described and illustrated in order to explain the nature of the invention, may be made by those skilled in the art within the principle and scope of the invention as expressed in the appended claim.

I claim:

A circuit for switching broad band radio frequency signals in a radar equipment comprising:

(a) a first pentode, (b) a load resistor connected to the anode of the pentode, (c) a bias resistor shunted by a radio frequency bypass capacitor connected to the cathode of the pentode, (d) a direct current source having a reference terminal, a positive terminal and a negative terminal, (e) the positive terminal being connected to the screen grid and to the load resistor, (f) the reference terminal being connected to the bias resistor, (g) a resistor connected between the suppressor grid and the negative terminal, the potential of the negative terminal relative to the reference terminal being sufficient to cut off the pentode, (h) a signal coupling circuit including a capacitor connected to the control grid and a resistor connected between the control grid and the reference terminal of the direct current source, (i) a second pentode substantially identical to the first pentode, (j) the anode of the second pentode being connected to the positive terminal of the direct current source, (k) the suppressor grid of the second pentode being connected in common with the suppressor grid of the first pentode, (l) the screen grid of the second pentode being connected to the anode of the first pentode, (m) the control grid of the second pentode being connected to the reference terminal of the direct current source, (n) an adjustable bias resistor connected to the cathode of the second pentode and the reference terminal of the direct current source, (o) whereby a predetermined level of direct current is drawn through the load resistor by the screen grid of the second pentode, and whereby when a positive rectangular pulse of predetermined amplitude is coupled to the suppressor grids of both pentodes, the first pentode draws anode current and the screen current of the second pentode is reduced in a relationship whereby the direct current component through the load resistor is essentially constant and the output of the circuit is essentially free of transient spikes, and whereby the bias resistor for the second pentode is adjustable to minimize switching pedestal.

References Cited by the Examiner

UNITED STATES PATENTS

| | | | |
|---|---|---|---|
| 2,092,496 | 9/1937 | Branson | 328—99 |
| 2,651,753 | 9/1953 | Buyer | 328—99 |
| 2,775,696 | 12/1956 | Thomas | 328—99 |
| 2,943,260 | 6/1960 | Barnard. | |

ARTHUR GAUSS, *Primary Examiner.*

B. P. DAVIS, *Assistant Examiner.*